United States Patent
Peters et al.

(10) Patent No.: US 6,310,930 B1
(45) Date of Patent: Oct. 30, 2001

(54) METHODS FOR GUIDING A FUEL BUNDLE INTO A CHANNEL

(75) Inventors: William C. Peters, Wilmington; David G. Smith, Leland; Edward G. Apple, Jr., Wilmington, all of NC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/548,350

(22) Filed: Apr. 12, 2000

(51) Int. Cl.$^7$ ............................................. G21C 19/00
(52) U.S. Cl. ........................ 376/261; 376/260; 376/446
(58) Field of Search ................................. 376/446, 261, 376/262, 272

(56) References Cited

U.S. PATENT DOCUMENTS

| | | | |
|---|---|---|---|
| 2,994,657 | * 8/1961 | Petrick | 376/446 |
| 3,389,056 | * 6/1968 | Frisch | 376/446 |
| 3,968,008 | * 7/1976 | Piepers et al. | 376/261 |
| 4,119,489 | * 10/1978 | Itoh et al. | 376/446 |
| 4,489,037 | * 12/1984 | Go | 376/261 |
| 4,676,945 | * 6/1987 | Barkhurst | 376/272 |
| 4,714,583 | * 12/1987 | Wachter | 376/272 |

* cited by examiner

Primary Examiner—Harvey E. Behrend
(74) Attorney, Agent, or Firm—Nixon & Vanderhye

(57) ABSTRACT

A guide assembly is seated at the upper end of a channel for a nuclear fuel bundle. The guide assembly includes a lower guide plate with an opening corresponding in dimension to the dimension of the spacers of the fuel bundle to be inserted. The lower guide plate mounts depending locators to locate the guide apparatus on the channel. An upper guide plate spaced above the lower guide plate mounts rollers spaced from the lower guide plate a distance corresponding to the distance between the first and second spacers of the fuel bundle. The fuel bundle is lowered through the guide apparatus by engagement of the spacers with the rollers and in the channel opening to ensure the fuel bundle is guided into the channel without damage to either.

11 Claims, 3 Drawing Sheets

METHODS FOR GUIDING A FUEL BUNDLE INTO A CHANNEL

BACKGROUND OF THE INVENTION

The present invention relates to apparatus and methods for guiding a nuclear fuel bundle into a channel and particularly relates to apparatus and methods for guiding a fuel bundle having a plurality of nuclear fuel rods, water rods and a plurality of spacers into a fuel bundle channel through an open upper end of the channel.

In the fabrication of fuel bundle assemblies for boiling water nuclear reactors, it is customary to lower the fuel bundle channel onto the fuel bundle. The fuel bundle comprises an array of nuclear fuel rods and one or more water rods with spacers at axially spaced positions along the fuel bundle. The channel comprises essentially an elongated rectilinear sleeve which, in assembly with the fuel bundle, engages the outer margins of the spacers. This conventional procedure for lowering the channel about the fuel bundle is practical in part because the channel weighs a small percentage of the overall weight of the fuel bundle, e.g., 50 to 60 pounds, and can be easily guided manually onto the bundle with minimum risk of damage to any of the fuel assembly components.

In certain fuel bundle assemblies, however, mechanical support for the fuel assembly is provided solely by a channel transition assembly and the bundle upper tie plate. The channel transition assembly typically consists of the channel attached at its bottom to a transition nose piece. The nose piece is dimensionally very similar to the dimensions of the outside of a lower tie plate but it does not have the lower grid plate that holds the fuel rod and water rod lower end plugs. Because the nose piece in the channel transition assembly is pre-attached to the channel, the conventional assembly procedure noted above cannot be used and the procedure must be reversed, i.e., the bundle must be lowered down into the channel. This substantially increases the risk of damage to fuel bundle components, especially to the fuel spacers, since the heavier weight of the bundle, e.g., 600 pounds, renders manual control of the position of the bundle more difficult while the fuel bundle is being lowered into the channel. The lowermost spacers of the fuel bundle are especially susceptible to damage during this procedure if the bundle and channel are misaligned relative to one another by as little as a tenth of an inch.

BRIEF SUMMARY OF THE INVENTION

In accordance with a preferred embodiment of the present invention, apparatus and methods are provided for guiding a nuclear fuel bundle into a channel to form the fuel bundle assembly. Particularly, a guide apparatus is attached to the top of the channel to align the fuel bundle and channel one with the other as the fuel bundle is lowered into the open upper end of the channel. The guide assembly, in a preferred embodiment, comprises upper and lower guide plates spaced one from the other, with each guide plate having an opening for registration with the opening at one end of the channel and sized to receive the bundle through the opening. The lower guide plate opening is dimensioned to correspond to the internal wall dimensions of the channel. Location corners and slides (shims) depend from the lower guide plate and engage about the upper end of the channel to locate the opening through the lower guide plate in accurate registration with the opening through the channel.

The upper guide plate is spaced above the lower guide plate by a plurality of structural support members which preferably diverge one from the other in a direction toward the upper guide plate. The opening through the upper guide plate is slightly larger, for example, on the order of ⅞-inch wider, than the opening through the lower guide plate. Mounted on top of the upper guide plate are a plurality of rollers, preferably four, located to engage the corners of the spacers of the fuel bundle as the fuel bundle is lowered through the upper guide plate opening. The four corner rollers on the upper guide plate are dimensioned to correspond to the interior dimensions of the channel corners, as well as the spacer corners. Thus, the rollers make contact with the corners of the fuel bundle spacers as the spacers pass beyond the rollers, providing with the lower guide plate opening and channel a second alignment point for the fuel bundle. The corner rollers are also located at a height above the lower guide plate which corresponds to the spacing between the first and second fuel spacers of the fuel bundles. This assures that the first spacer is properly aligned as it enters the channel. Additional spring-biased sets of rollers may be provided along the structural members between the rollers fixtured on the upper guide plate and the bottom guide plate to engage the fuel rods at corners of the bundle as the fuel bundle is lowered into the channel. The spring-biased sets of rollers are displaced outwardly against their spring bias when the next spacer arrives at that elevation during the guided insertion procedure.

Additionally, visual alignment indicators are carried by the first and second guide plates to provide visual indication of any misalignment of the fuel bundle and channel. The indicators provide a visual alignment guide to ensure that there is no tilt of the fuel bundle relative to the channel. Once the fuel bundle has been lowered through the guide apparatus and into the channel, the guide apparatus can be lifted off the top of the channel. The use of this guide assembly permits the installation of the fuel bundles into the channels, both in the pool at the nuclear reactor site, as well as during fabrication of the fuel bundle assembly.

In a preferred embodiment according to the present invention, there is provided apparatus for guiding a nuclear fuel bundle having a plurality of fuel rods, at least one water rod and a plurality of spacers for insertion into a fuel bundle channel having an opening at one end thereof, comprising a guide assembly having first and second guide members spaced from and in registration with one another, the first guide member having an opening for registration with the opening at one end of the channel sized to receive the fuel bundle therethrough, channel locators carried by the first guide member for engaging the channel about the channel opening to locate the first guide member opening in registration with the channel opening, the second guide member having an opening therethrough larger than the opening through the first guide member for receiving the fuel bundle, structural members maintaining the first and second guide members spaced from one another with the openings therethrough in spaced registration with one another and guide elements carried by the second guide member and spaced thereabout for engaging and guiding the fuel bundle through the registering openings of the first and second guide members and the channel.

In a further preferred embodiment according to the present invention, there is provided a method of inserting a nuclear fuel bundle having a plurality of fuel rods, a water rod and a plurality of spacers into a fuel bundle channel, comprising the steps of (a) providing a guide assembly at an open upper end of the channel with guide elements carried thereby spaced above the open upper end of the channel and (b) lowering the fuel bundle through the guide assembly including engaging the fuel bundle along the guide elements to guide the lower end of the fuel bundle through the channel opening into the channel.

DETAILED DESCRIPTION OF THE INVENTION

Figure 1:
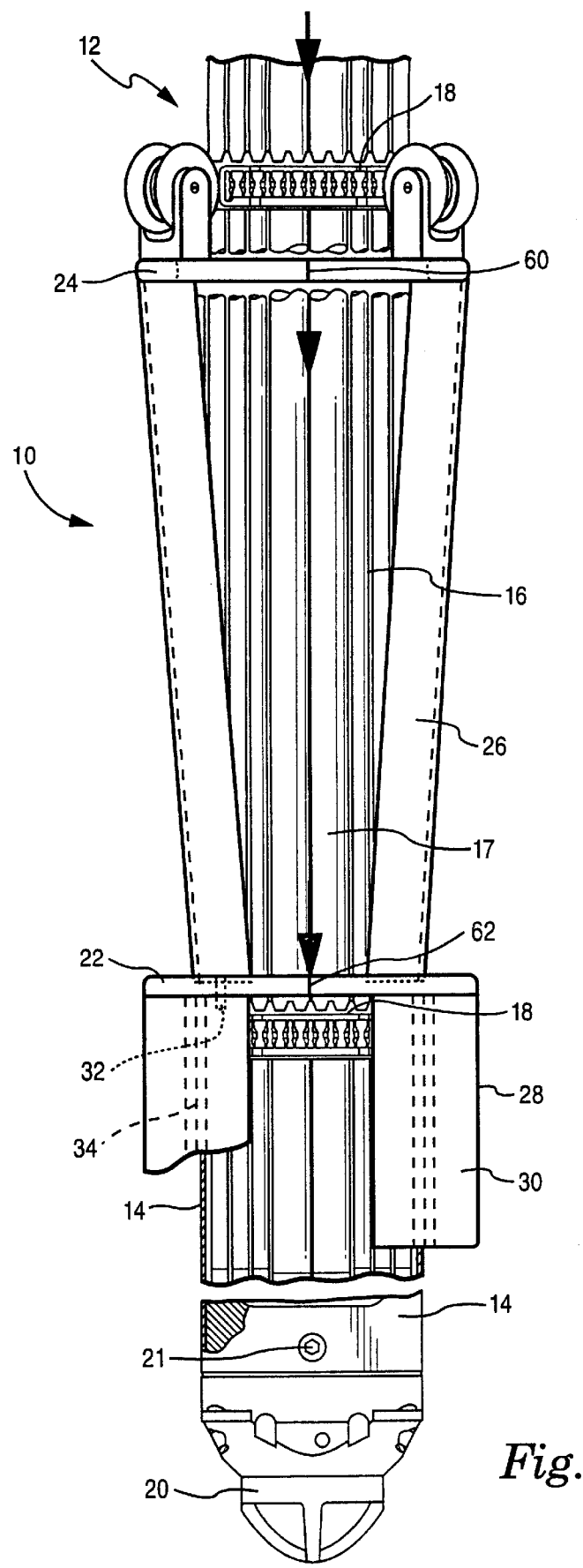
FIG. 1 is a fragmentary side elevational view with parts broken out and in cross-section illustrating a fuel bundle being installed in a channel employing a guide apparatus in accordance with the present invention.

Referring now to the drawings, particularly to FIG. 1, there is illustrated a guide apparatus constructed in accordance with a preferred embodiment of the present invention and generally designated 10. Apparatus 10 as illustrated is employed to guide a fuel bundle, generally designated 12, into a fuel bundle channel 14. The fuel bundle 12 includes a plurality of elongated fuel rods 16 and at least one water rod 17 which pass through spacers 18 located at axially spaced positions along the length of the array of fuel rods 16. It will be appreciated that the spacers have a peripheral margin which extends laterally outwardly of the fuel rods in the fuel bundle and that the margins of the spacers 18 engage the interior wall surfaces of the channel 14 upon final assembly of the fuel bundle into the channel 14. As illustrated in FIG. 1, channel 14 has a nose piece 20 at its lower end, the channel 14 being secured by fasteners 21 to the nose piece 20. Consequently, it will be appreciated that the fuel bundle 12 comprised of the fuel rods and spacers must be inserted into the open upper end of the channel 14 because the channel cannot be lowered onto or about the fuel bundle as in the prior art.

The guide assembly 10 includes a lower guide member or plate 22 and an upper guide member or plate 24 spaced one from the other by structural members 26 extending between the guide plates. The lower guide plate 22 has a plurality of depending channel locators 28 for positioning the guide assembly 10 on the upper end of the channel 14. Preferably, the channel locators 28 include four angle or corner members 30 secured to the underside of the lower guide plate 22 by screws 32. The inside surfaces of the channel corner members 30 are each provided with an elongated channel location slide or shim 34. The shims 34 are preferably formed of a plastic material such that their engagement about the external surfaces of the channel upon installation does not damage the channel. Also, the shims are provided in various sizes to accommodate dimensional variations in the channels thereby enabling accurate alignment of the guide assembly and channel even after channel irradiation. Consequently, the channel locators 28 precisely locate the guide assembly 10 on top of the channel 14.

Figure 6:
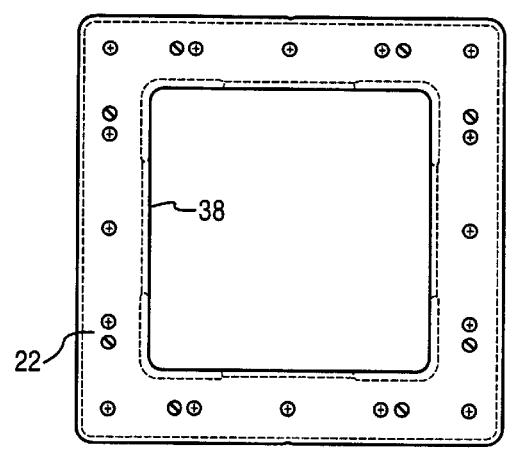

As illustrated in FIG. 6, the lower guide plate 22 has an interior opening 38 dimensioned to conform to the internal dimensions of the channel 14. Consequently, when the lower guide plate is disposed on top of the channel 14 with the channel locators 28 engaging the corners of the channel, the lower guide plate opening 38 is in alignment with the interior wall surfaces of the channel. The opening 38 also corresponds to the outer margins of the spacers 18 of the fuel bundle.

Figure 5:
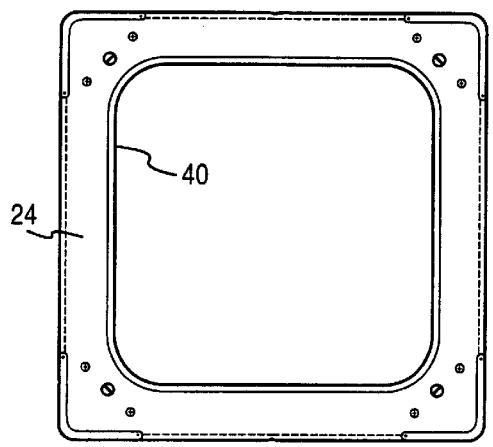
FIGS. 5 and 6 are plan views of the upper and lower guide plates, respectively.

Referring to FIG. 5, the upper guide plate 24 has an interior opening 40 dimensioned in excess of the lateral dimensions of the spacers 18. The opening is thus enlarged, for example, on the order of ⅞-inch larger than the opening 38 to the lower guide plate 22. The upper guide plate 24 is supported above the lower guide plate 22 by a plurality of structural members 26, preferably four, which maintain the upper and lower guide plates spaced from one another, with the openings 38 and 40 therethrough in spaced registration with one another. The structural members 26 are preferably angled members which extend from their lower ends upwardly and outwardly to diverge one from the other to the underside of guide plate 24. The members 26 are secured at opposite ends to the upper and lower guide plates 24 and 22, respectively, e.g., by welds on the underside of the corners of guide plate 24 and on the upper face of lower guide plates 22.

Figure 2:
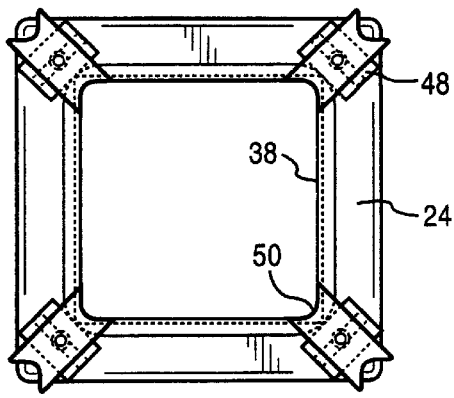
FIG. 2 is a top plan view of the guide apparatus.
Figure 3:
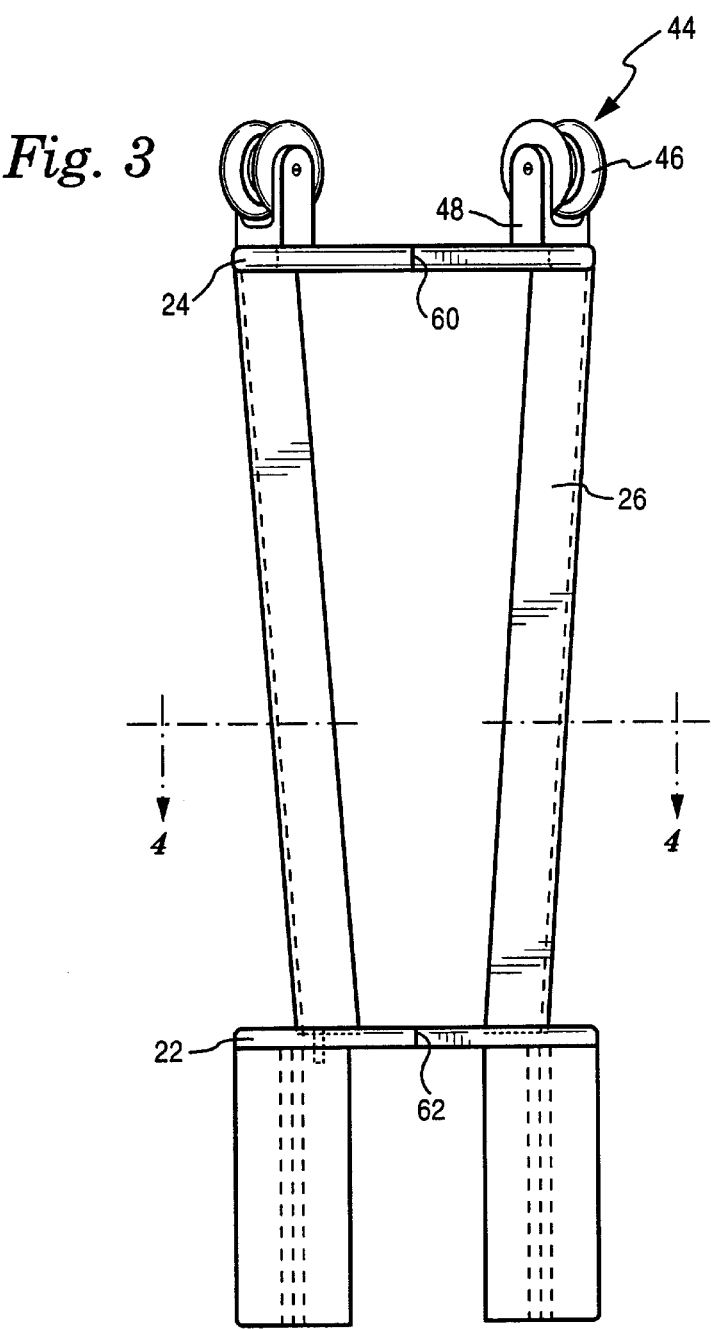
FIG. 3 is a side elevational view of the guide apparatus.
Figure 4:
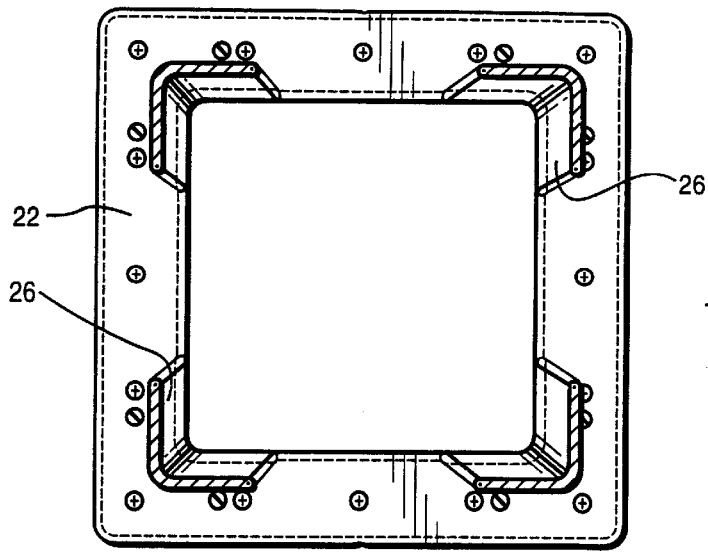
FIG. 4 is a cross-sectional view thereof taken generally about on line 4—4 in FIG. 3.
Figure 7:
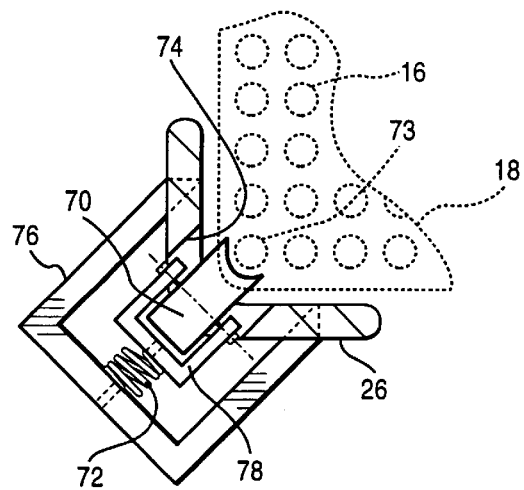
FIG. 7 is a cross-sectional view similar to FIG. 4 illustrating a fuel rod guide located along a structural member of the guide apparatus.

Mounted on top of the upper guide plate 24 are a plurality of guide elements 44 (FIG. 3). Preferably, the guide elements comprise rollers 46 carried by clevis mounts 48 secured to the guide plate 24. The rollers 46 have surfaces corresponding in configuration to the configuration of the corners of the spacers 18 of the fuel bundle 12. Note also in FIG. 2 that the surfaces 50 of the rollers 46 register with the corners of the opening 38 through the lower guide plate 22. Additional sets of spring-biased rollers 70 (FIG. 7) may be mounted on the structural members 26 intermediate the upper and lower guide plates. The rollers 70 engage the corner fuel rods 73 of the fuel bundle 12 as the fuel bundle is lowered into the channel to maintain the alignment of the fuel bundle during its insertion into the channel. These additional rollers are displaced against the bias of the springs upon engagement with the spacers 18 as the spacers pass the spring-biased rollers 70 during downward travel of the fuel bundle into the channel 14. Also, the spacing between the corner rollers 46 and the top of the channel 14 corresponds to the spacing between the first and second fuel spacers of the bundle. This ensures that the first spacer 18 is properly aligned with the channel opening as it enters the channel.

As an additional alignment aid, the guide apparatus has a pair of alignment indicators 60 and 62 (FIG. 3) disposed along the upper and lower guide plates 24 and 22, respectively. These alignment indicators may comprise V-notches on each of the four sides of each of the upper and lower plates. Consequently, as the fuel bundle is being lowered into the channel 14, visual inspection of the alignment of the fuel bundle with the V-notches 60 and 62 can indicate whether the fuel bundle 12 is out of alignment with the channel.

In use, the guide apparatus 10 is first disposed on the upper end of a channel 14, the channel 14 being maintained in an upright position by fixturing, not shown. Particularly, the guide assembly 10 is lowered onto the upper end of the channel with the shims 34 of the channel locators 28 engaging sides of the channel adjacent the channel corners. With the locators 28 disposed along the corners of the channel and the lower guide plate 22 disposed on top of the channel, the guide apparatus is automatically aligned with the channel opening.

The fuel bundle 12 is then disposed into the guide apparatus through the open upper end thereof. As the first spacer comes into engagement with the rollers 46, the fuel bundle is rotationally aligned with the channel. As the fuel bundle is lowered, its lower end enters the channel 14. Upon further lowering of the fuel bundle relative to the channel, the second spacer engages the rollers 46. Because of the dimensional relationship between the upper and lower guide plates, the first spacer enters the channel 14 at the time the second spacer engages the rollers 46. This ensures accurate alignment of the bundle and channel. As the fuel bundle is progressively lowered further or inserted into the channel, the spacers of the bundle engage one after another along the rollers to maintain alignment of the fuel bundle and channel. The additional rollers 70 between the upper and lower guide plates likewise maintain the alignment of the fuel bundle 12 when the spacers 18 pass below the rollers 46 until the next spacer engages rollers 46.

Visual inspection of the alignment during the insertion process is also obtained. By visually aligning the V-notches 60 and 62 on each of the four sides of the guide apparatus with the bundle during bundle insertion, assurance is obtained that the bundle is not canted relative to the channel. After the fuel bundle is completely inserted into the channel 14, the guide apparatus 10 is lifted off the upper end of the channel.

It may be desirable to locate further guides intermediate the lower and upper guide plates 22 and 24, respectively, to guide the fuel bundle 12 at times during the lowering of the fuel bundle when a spacer 18 is not guided by the rollers 46. For that purpose, the structural members 26 have additional guide rollers 70 (FIG. 7) at locations intermediate the upper and lower guide plates to engage the comer fuel rods 73. The rollers 70 are spring-biased inwardly to engage the comer fuel rods and are displaced outwardly against the bias of spring 72 when a spacer 18 is lowered past the rollers 70. To accomplish this, an opening 74 is provided through the structural member 26. A bracket 76 projects along the outside of member 26 and mounts a clevis 78 which, in turn, pivotally carries the roller 70. The clevis 78 is spring-biased by spring 72 toward the fuel bundle 12. While the fuel rods 16 are not normally considered as structural elements, the spacing between the spacers 18 is limited. Also, the fuel rods are captured by the spacers 18. Thus, the forces applied to the corner fuel rods by the rollers 70 at the four corners of the fuel bundle are sufficient to maintain alignment of the fuel bundle 12 and channel 14 while not causing undue stress on the fuel rods.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of inserting a nuclear fuel bundle having a plurality of fuel rods, a water rod and a plurality of spacers into a fuel bundle channel, comprising the steps of:
   (a) providing a guide assembly at an open upper end of the channel with guide elements carried thereby spaced above the open upper end of the channel; and
   (b) lowering the fuel bundle through the guide assembly including engaging the fuel bundle along the guide elements to guide the lower end of the fuel bundle through the channel opening into the channel.

2. A method according to claim 1 wherein the guide assembly includes upper and lower guide members having openings for receiving the fuel bundle and including the step of locating the guide assembly on the top of the channel with the opening through the lower guide member in registration with the channel opening and lowering the fuel bundle through the openings of the guide members into the channel opening.

3. A method according to claim 2 including spacing the guide elements from the lower guide member a distance substantially corresponding to the distance between first and second spacers of the fuel bundle enabling alignment of the first spacer with the channel upon entry of the fuel bundle into the channel opening.

4. A method according to claim 1 including providing visual indicia on the guide assembly to ascertain alignment of the fuel bundle and channel with one another.

5. A method according to claim 1 wherein the guide assembly includes a lower guide member having an opening in registry with the channel opening and including the step of aligning the lower guide member relative to the channel to locate the opening through the lower guide member and channel opening in registration with one another.

6. A method according to claim 5 including providing channel corner locators depending from the lower guide member for engaging corners of the channel to maintain the guide assembly aligned with the channel.

7. A method according to claim 6 including applying shims to said corner locators to obtain accurate alignment of the guide assembly and the channel.

8. A method according to claim 2 including the step of guiding the fuel bundle by engaging fuel rods of the fuel bundle with rollers located between said upper and lower guide members.

9. A method according to claim 8 including biasing said rollers into engagement with comer fuel rods of the fuel bundle and displacing the rollers from their engagement with the comer fuel rods upon engagement of the rollers by the fuel bundle spacers.

10. A method according to claim 1 including performing steps (a) and (b) within a pool at a nuclear reactor site.

11. A method according to claim 1 including performing steps (a) and (b) during initial fabrication of the nuclear fuel bundle prior to use in a nuclear reactor.

* * * * *

UNITED STATES PATENT AND TRADEMARK OFFICE
CERTIFICATE OF CORRECTION

PATENT NO. : 6,310,930 B1
DATED : October 30, 2001
INVENTOR(S) : Peters et al.

It is certified that error appears in the above-identified patent and that said Letters Patent is hereby corrected as shown below:

Column 2,
Lines 11 and 12, delete "comers" and insert -- corners --;

Column 5,
Line 33, delete "comer" and insert -- corner --;
Line 13, delete "comer" and insert -- corner --.

Column 6,
Line 47, delete "comer" and insert -- corner --; and
Line 49, delete "comer" and insert -- corner --

Signed and Sealed this

Twenty-first Day of May, 2002

Attest:

JAMES E. ROGAN
Attesting Officer      Director of the United States Patent and Trademark Office